United States Patent

Mouri

[11] Patent Number: 5,096,256
[45] Date of Patent: Mar. 17, 1992

[54] RETRACTABLE CENTER ARMREST FOR MOTOR VEHICLES

[75] Inventor: Takayuki Mouri, Kanagawa, Japan
[73] Assignee: Ikeda Bussan Co., Ltd., Ayase, Japan
[21] Appl. No.: 618,622
[22] Filed: Nov. 27, 1990

[30] Foreign Application Priority Data
Nov. 29, 1989 [JP] Japan .................... 1-138467[U]

[51] Int. Cl.⁵ ............................................. A47C 13/00
[52] U.S. Cl. ........................................................ 297/113
[58] Field of Search ................ 297/112, 113, 191, 411

[56] References Cited
U.S. PATENT DOCUMENTS

| | | | |
|---|---|---|---|
| 1,835,947 | 12/1931 | Johannsen | 297/113 |
| 2,710,049 | 6/1955 | Potocnik | 297/113 |
| 3,951,448 | 4/1976 | Hawie | 297/191 X |
| 4,558,901 | 12/1985 | Yokoyama | 297/113 |

Primary Examiner—Kenneth J. Dorner
Assistant Examiner—J. Bonifanti
Attorney, Agent, or Firm—Foley & Lardner

[57] ABSTRACT

A motor vehicle having a partition wall includes a seat having a seat cushion and a seatback. The seatback is located immediately adjacent to the partition wall with its back surface facing the partition wall. The seatback is formed at a laterally middle portion thereof with a through opening. An armrest is so sized as to fit into the through opening. A bracket is secured to the seatback laterally and extends across the through opening. The bracket is fastened to the partition wall with bolts and nuts. A covering plate is detachably disposed in the through opening to conceal the bracket.

12 Claims, 4 Drawing Sheets

RETRACTABLE CENTER ARMREST FOR MOTOR VEHICLES

BACKGROUND OF THE INVENTION

1. Field of the Invention

The present invention relates in general to seats for automobiles, and more particularly to automotive rear seats of a type which is equipped with a retractable center armrest.

2. Description of the Prior Art

In order to clarify the task of the present invention, two prior art rear seats of the above-mentioned type will be described with reference to FIGS. 4, 5, 6 and 7 of the accompanying drawings.

A first example is shown in FIGS. 4 and 5.

As is seen from FIG. 4, the seat 10 comprises generally a seat cushion 12 and a seatback 14. The seatback 14 is formed at a laterally middle portion thereof with a rectangular opening 16 which is sized and constructed for neatly receiving an armrest 34. The seatback 14 is located immediately adjacent to a rear partition wall 18 of a motor vehicle with its back surface facing the wall 18.

Referring to FIG. 5, an armrest supporting bracket 30 which is U-shaped extends laterally in a lower portion of the opening 16. The armrest supporting bracket 30 has opposed bent ends secured to opposed side walls 32 of the opening 16. (The arrangement of the armrest supporting bracket 30 relative to the opening 16 will be well understood from FIG. 1).

The armrest 34 is rectangular parallelopiped in shape, which has a rear end portion pivotally held between and by the opposed bent ends of the armrest supporting bracket 30. Thus, the armrest 34 can pivot between a raised inoperative position wherein the armrest 34 fits in the rectangular opening 16, and a laid operative position wherein the armrest 34 is laid horizontally on the seat cushion as shown in FIG. 4.

Designated by numeral 36, is a covering plate of flexible plastic. As is seen from FIG. 4, the covering plate 36 has two access holes 38 and is sized so as to cover or close the opening 16. The covering plate 36 is secured to the back surfaces of the seatback 14 and the seat cushion 12, as is understood from FIG. 5.

Behind the covering plate 36, there is arranged a seatback supporting bracket 40 which has opposed bent ends and two bolt holes 42. The seatback supporting bracket 40 extends laterally across the covering plate 36 and is secured at the bent ends to the back surface of the seatback 14 in a manner to align the bolt holes 42 with the access holes 38.

As is seen from FIG. 4, the partition wall 18 has a large opening across which center and lower beams 18a and 18b extend laterally. The wall 18 has three upper catches 20 secured to a front upper portion thereof and two lower catches 22 secured to front lower corner portions thereof. The center beam 18a of the wall 18 has two bolt holes 24 at a middle portion thereof. Two nuts 26 are welded to the center beam 18a, which are aligned with the bolt holes 24 respectively.

Referring to FIG. 5, the seatback 14 is equipped with five hooks 28 at portions corresponding to the portions of the partition wall 18 where the catches 20 and 22 are located.

Upon assembly, the seatback 14 is supported by the partition wall 18 having the hooks 28 engaged with the catches 20 and 22.

For assuring the connection of the seatback 14 with the partition wall 18, two bolts 44 are further employed in the following manner.

From each access hole 38, a bolt 44 is inserted into the seatback supporting bolt hole 42 of the bracket 40 and the bolt hole 24 of the center beam 18a of the partition wall 18 and threadedly engaged with the corresponding nut 26. With this, the seatback 14 is fastened to the partition wall 18.

Two grommet nuts 46 are put into the access holes 38 to conceal the access holes 38.

Second example of the two prior art rear seats is shown in FIGS. 6 and 7.

Since the second example is similar in construction to the above-mentioned first example, the following description will be directed to only parts and constructions which are different from those of the first example.

As is seen from FIG. 7, the seatback supporting bracket 40 used in the second example has a stepped configuration, which is formed at a middle portion thereof with a raised part 40a and at both sides of the raised part 40a with depressed parts 40b. The depressed parts 40b have bolt holes which are mated with the bolt holes of the center beam 18a of the partition wall 18.

As is seen from FIG. 6, from each access hole 38, each bolt 44 is inserted into the mated bolt holes and threadedly engaged with the corresponding nut 26.

In this example, a flexible cloth sheet 48 is used for concealing the access holes 38.

The flexible cloth sheet 48 has a lower end secured to a base portion of the armrest 34 and an upper end equipped with a hook 52. The hook 52 is caught by a catch 50 which is secured to the covering plate 36. Thus, as is understood from FIG. 6, the two access holes 38 of the covering plate 36 are concealed by the cloth sheet 48.

However, due to their inherent constructions, the rear seats 10 of the above-mentioned first and second examples have the following drawbacks.

That is, in each example, using the grommet nuts 46 or the flexible cloth sheet 48 for concealing the access holes 38 causes an increase in production costs of the rear seat 10 because of an increase in parts required and also because it is difficult or troublesome to work with the grommet nuts 46 or the flexible cloth sheet 48 in order to fix them in the proper position. Furthermore, since the grommet nuts 46 or the flexible cloth sheet 48 is not aesthetically matched with the covering plate 36, the external appearance of the rear seat 10 is lowered considerably.

SUMMARY OF THE INVENTION

Therefore, it is an object of the present invention to provide an automotive rear seat of a type which is equipped with an arm rest, which is free of the above-mentioned drawbacks.

According to the present invention, there is provided, in a motor vehicle having a partition wall, a seat which comprises a seat cushion and a seatback, the seatback being located immediately adjacent to the partition wall with its back surface facing the partition wall, securing means for securing the seatback to the partition wall, means for defining in the seatback a through opening to which at least a part of the securing means is exposed, an armrest which is so sized as to fit into the through opening of the seatback, and a covering plate which is detachably disposed in the through opening to conceal the part of the securing means.

BRIEF DESCRIPTION OF THE DRAWINGS

Other objects of the present invention will become apparent from the following description when taken in conjunction with the accompanying drawings, in which.

DETAILED DESCRIPTION OF THE INVENTION

Figure 1:
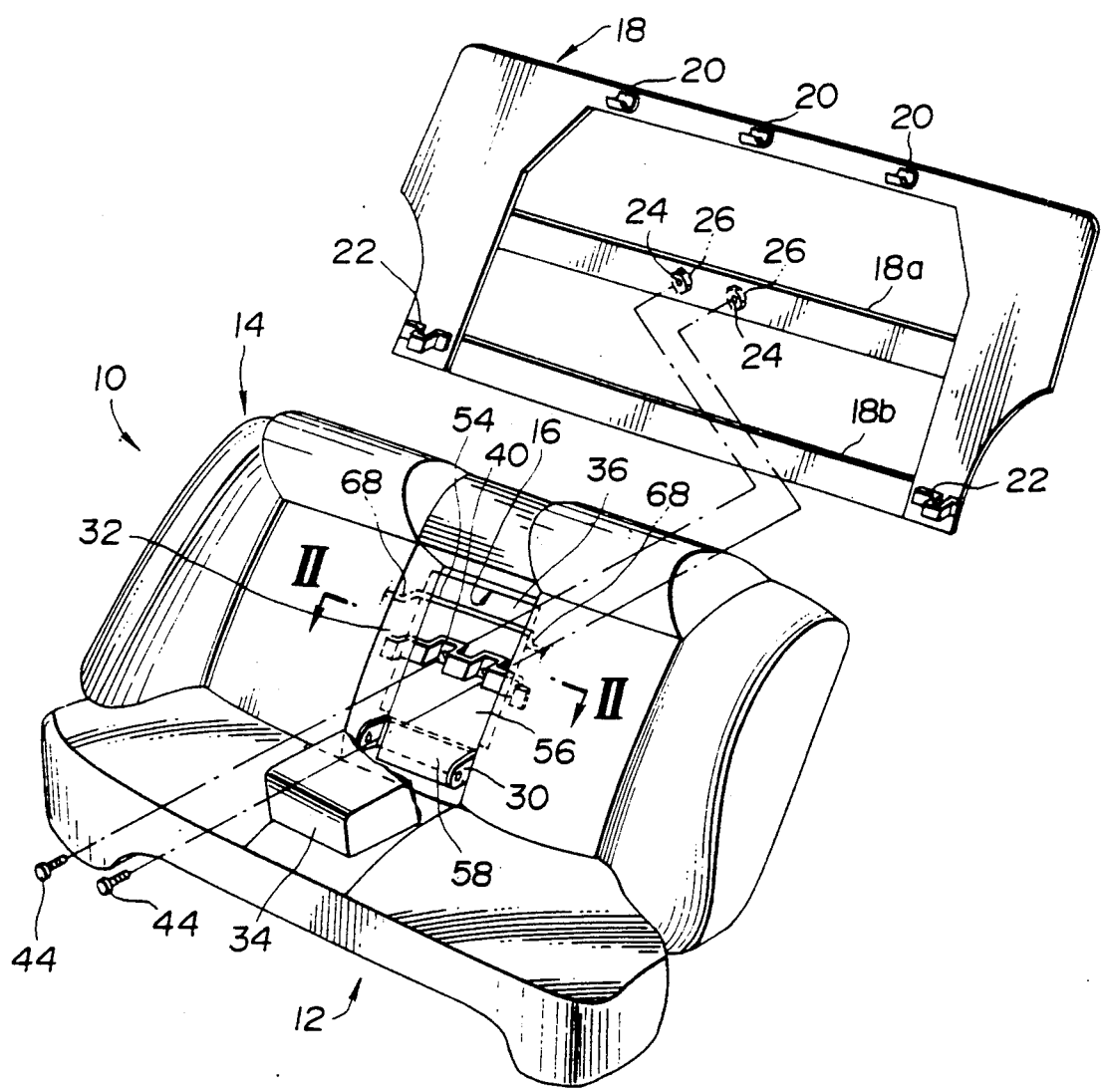
FIG. 1 is an exploded perspective view of a rear seat of the present invention.
Figure 2:
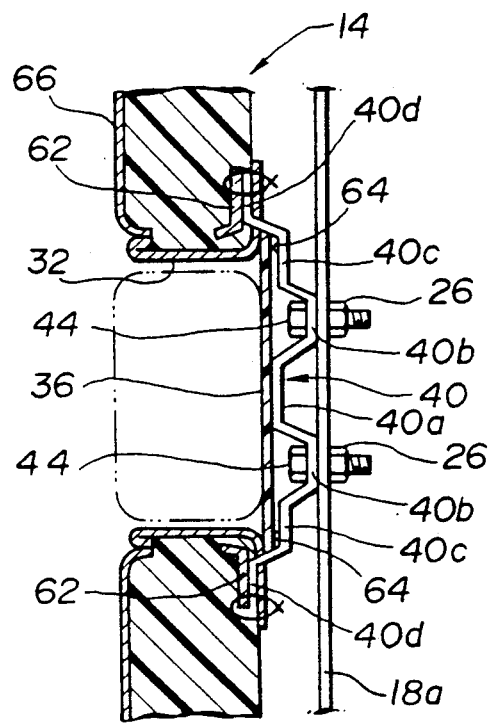
FIG. 2 is an enlarged sectional view taken along the line II—II of FIG. 1.
Figure 3:
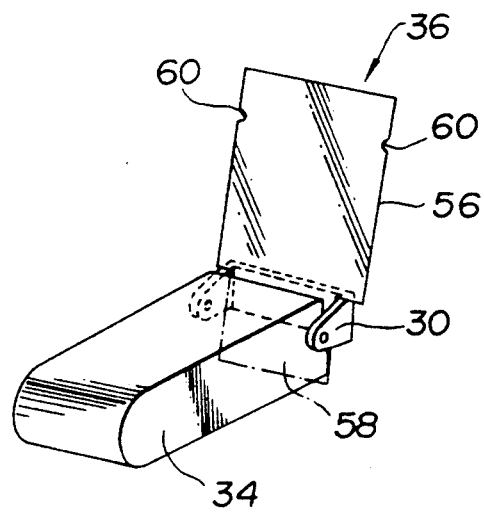
FIG. 3 is a partial view showing an arm rest, an armrest supporting bracket and a covering plate.
Figure 4:
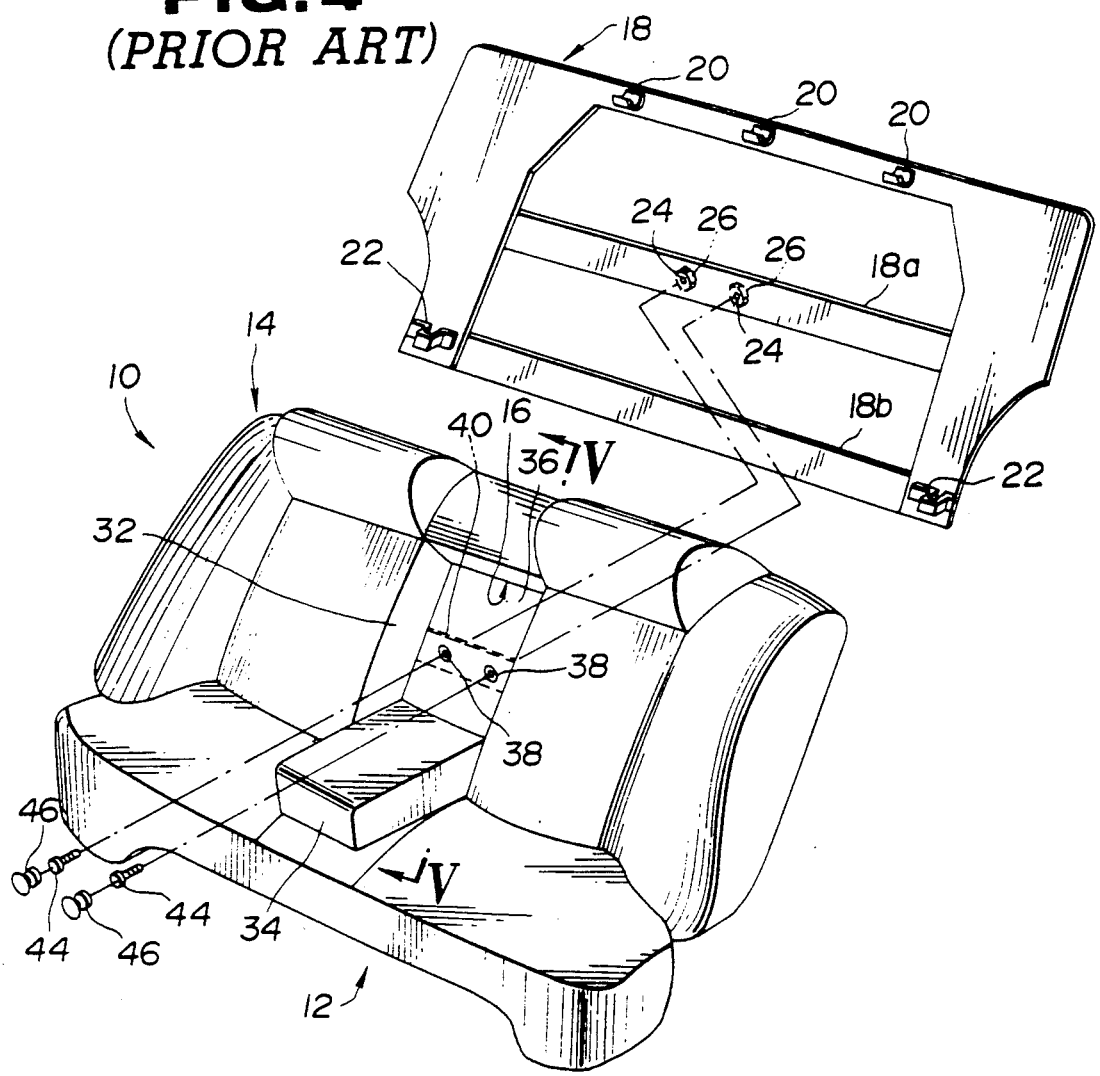
FIG. 4 is a view similar to FIG. 1, but showing one prior art rear seat.
Figure 5:
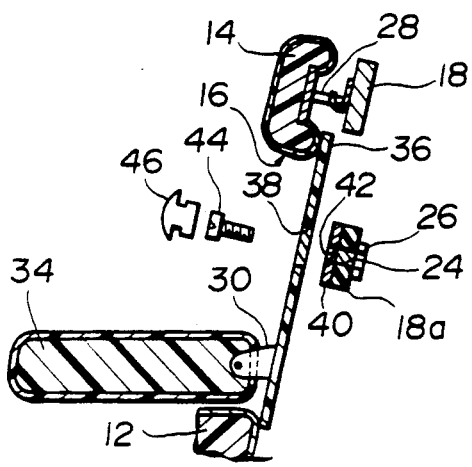
FIG. 5 is a sectional, but partially cut away, view taken along the line V—V of FIG. 4.
Figure 6:
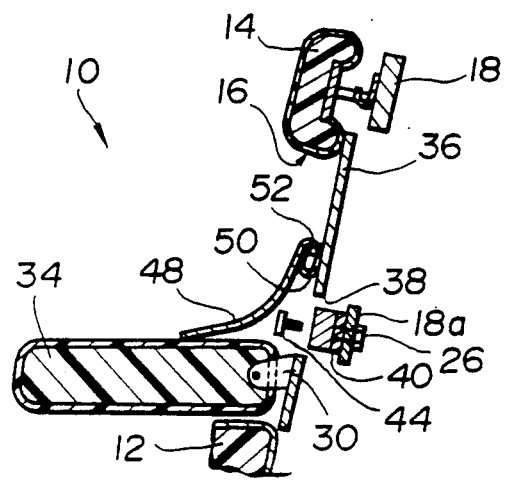
FIG. 6 is a view similar to FIG. 5, but showing the other prior art rear seat.
Figure 7:
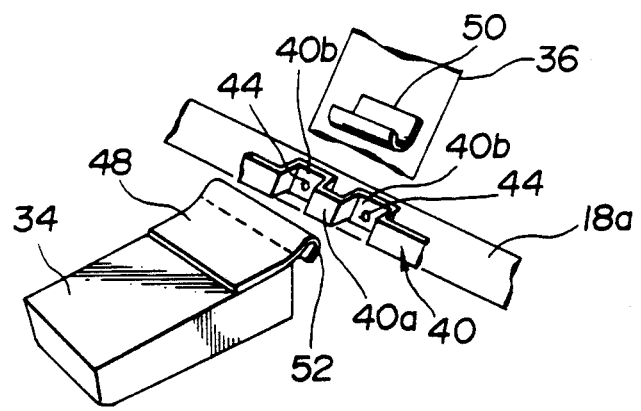
FIG. 7 is a perspective, but partially cut away and exploded, view of an essential portion of the rear seat of FIG. 6.

Referring to FIGS. 1-3, there is shown a rear seat of the present invention.

Since the rear seat of the invention is similar in construction to the above-mentioned conventional rear seats, the following description will be directed to only parts and constructions which are different from those of the conventional rear seats. The similar parts are designated by the same numerals as the conventional rear seats.

As is seen from FIG. 1, designated by numeral 54 is a resilient metal rod which is generally U-shaped and has its both end portions bent in right angles. The bent end portions, which thus serve as leg portions of the rod 54, are secured at their leading ends to the back surface of the seatback 14.

As is seen from FIG. 2, the seatback supporting bracket 40 employed in the invention has a stepped configuration, which is formed at a middle portion thereof with a first raised part 40a, at both sides of the first raised part 40a with depressed parts 40b, at both sides of the depressed parts 40b with second raised parts 40c, and at both sides of the second raised parts 40c with third raised parts 40d. The depressed parts 40b have bolt holes which are mated with the bolt holes of the center beam 18a of the partition wall 18.

As is seen from FIG. 3, the covering plate 36 employed in the invention has an upper larger rectangular portion 56 and a lower smaller rectangular portion 58 which are united. The lower smaller rectangular portion 58 is so sized as to be inserted into a space defined between the armrest, supporting bracket 30 and the armrest 34. The upper larger portion 56 is so sized as to cover or close the opening 16 when the armrest 34 is in the laid operative position. The covering plate 36 is formed at its upper side edges with respective notches 60 which are to be engaged with the aforementioned leg portions of the metal rod 54.

For assembling the rear seat 10 which has the arm rest 34, the following steps are taken.

First, as is seen from FIG. 2, the seatback-supporting bracket 40 is secured at the third raised parts 40d thereof to the respective frames 62 of the seatback 14 so that the seatback-supporting bracket 40 laterally extends across a middle portion of the opening 16 (see FIG. 1). With this, there are produced two grooves 64, each being defined between the rear corner portion of an outer skin member 66 of the seatback 14 and the second raised part 40c of the seatback-supporting bracket 40.

Thereafter, referring back to FIG. 1, the metal rod 54 is secured at the leading ends of the leg portions to the respective frames 62 of the seatback 14 so that the metal rod 54 extends across an upper portion of the opening 16.

Then, the seatback 14 is supported by the partition wall 18 having the hooks 28 engaged with the catches 20 and 22.

For assuring the connection of the seatback 14 with the partition wall 18, two bolts 44 are further employed in the following manner.

As is understood from FIG. 2, the bolts 44 are inserted into the bolt holes of the seatback-supporting bracket 40 and the bolt holes of the center beam 18a of the partition wall 18, and threadedly engaged with the nuts 26. With this, the seatback 14 is fastened to the partition wall 18.

Then, as is understood from FIGS. 1 and 3, the covering plate 36 is vertically thrust into the opening 16 from the front upper side of the opening 16 so as to insert the lower smaller rectangular portion 58 thereof into space between a major portion of the armrest-supporting bracket 30 and the armrest 34. With this, the covering plate 36 is supported by the armrest-supporting bracket 30.

Then, the larger rectangular portion 56 of the covering plate 36 is pushed rearward in such a manner that the covering plate 36 pivots about the boundary between the upper larger rectangular and lower smaller rectangular portions 56 and 58.

Referring to FIGS. 1 and 2, immediately after the covering plate 36 passes through the opening 16, the side edges of the upper larger rectangular portion 56 of the covering plate 36 will fit into the grooves 64. In concurrence with this, the central portion of the covering plate 36 is brought into abutment with a front surface of the first raised part 40a of the seatback-supporting bracket 40. At the same time, as is understood from FIGS. 1 and 3, the notches 60 of the covering plate 36 are brought into engagement with the leg portions of the metal rod 54, and an upper part of the lower smaller rectangular portion 58 of the covering plate 36 is brought into abutment with the front surface of the major portion of the armrest-supporting bracket 30. Thus, the covering plate 36 is stably held in place without play.

The advantages of the present invention will be described in the following.

Unlike the conventional rear seats, the covering plate 36 is thrust into the opening 16 from the front upper side of the opening 16 after the bolts 44 are inserted into the bolt holes of the seatback-supporting bracket 40 and the bolt holes of the center beam 18a of the partition wall 18 and threadedly engaged with the nuts 26. Therefore, it is not necessary to form access holes in the covering plate 36 to insert the bolts 44 therethrough. Thus, parts such as grommet nuts or a flexible cloth sheet become unnecessary and the number of parts which constitute the rear seat is reduced as compared with conventional rear seats. Furthermore, unlike conventional rear seats, the covering plate 36 is the only member which is seen through the opening 16, thereby considerably enhancing the external appearance of the rear seat.

What is claimed is:

1. A motor vehicle comprising; a partition wall:
   a seatback including a seat cushion and a seatback having a through opening therein, said seatback being located immediately adjacent to said partition wall with a back surface of said seatback facing said partition wall;
   a seatback-supporting bracket at least partially disposed in said through opening for securing said seatback to said partition wall, said seatback-supporting bracket secured to said seatback and arranged so as to define opposed grooves between said seatback and said seatback-supporting bracket;
   an armrest sized to fit into said through opening; and
   a covering plate, having opposed edges, detachably disposed in said through opening to conceal said seatback-supporting bracket, said covering plate being of a size to pass through said through opening such that each of said opposed edges fits into a respective one of said opposed grooves, whereby said covering plate becomes fixed relative to said seatback.

2. A motor vehicle as claimed in claim 1, further comprising:
   catches secured to said partition wall;
   hooks secured to said seatback, said hooks being engaged with said catches;
   means for defining in said seatback-supporting bracket first bolt holes;
   means for defining in said partition wall second bolt holes which become mated with the respective first bolt holes of said seatback-supporting bracket when said seatback-supporting bracket is properly positioned relative to said partition wall;
   bolts each passing through one of the mated first and second bolt holes; and
   nuts each being operatively engaged with one of said bolts to fasten said seatback-supporting bracket to said partition wall.

3. A motor vehicle as claimed in claim 1, in which said seatback-supporting bracket laterally extends across said through opening, said opposed grooves being sized to receive one of said opposed edges of said covering plate.

4. A motor vehicle as claimed in claim 3, in which said covering plate has upper larger rectangular and lower smaller rectangular portions which are united, said upper larger rectangular portion being so sized as to conceal said seatback-supporting bracket, said upper larger rectangular portion being fit at said opposed edges thereof in said grooves.

5. A motor vehicle as claimed in claim 4, further comprising an armrest-supporting bracket secured to said seatback and extending across said through opening at a position below said seatback-supporting bracket, said armrest-supporting bracket having said armrest pivotally connected thereto.

6. A motor vehicle as claimed in claim 5, further comprising a metal rod which is secured to said seatback and extends across said through opening at a position above said seatback-supporting bracket.

7. A motor vehicle as claimed in claim 6, in which said upper larger rectangular portion of said covering plate is formed at each opposed edge thereof with a notch, said notch being engaged with said metal rod.

8. A motor vehicle as claimed in claim 7, in which said lower smaller rectangular portion is inserted into a space defined between said armrest and said armrest-supporting bracket.

9. A motor vehicle as claimed in claim 8, in which a central portion of said upper larger rectangular portion is in abutment with a middle portion of said seatback-supporting bracket when said covering plate is properly positioned relative to said through opening.

10. A motor vehicle as claimed in claim 9, in which an upper part of said lower smaller rectangular portion is in abutment with a front surface of a major portion of said armrest-supporting bracket when said covering plate is properly positioned relative to said through opening.

11. A motor vehicle as claimed in claim 10, in which said seatback-supporting bracket is so shaped as to position said bolts to be away from said covering plate.

12. A motor vehicle as claimed in claim 1, wherein said covering plate completely closes said through opening.

* * * * *